United States Patent [19]
Tuma

[11] Patent Number: 5,340,238
[45] Date of Patent: Aug. 23, 1994

[54] METHOD AND APPARATUS FOR TESTING ABOVE GROUND LIQUID STORAGE TANKS FOR LEAKS

[75] Inventor: John E. Tuma, Friendswood, Tex.

[73] Assignee: Tanknology Corporation International, Houston, Tex.

[21] Appl. No.: 992,422

[22] Filed: Dec. 17, 1992

Related U.S. Application Data

[63] Continuation-in-part of Ser. No. 925,372, Aug. 4, 1992.

[51] Int. Cl.$^5$ .............................. F16L 1/00; E21B 7/04; B09B 1/00
[52] U.S. Cl. ...................................... 405/184; 175/45; 175/73; 405/52; 405/128
[58] Field of Search ................... 405/52, 53, 154, 184, 405/128, 129; 175/53, 62, 61, 73–76, 45, 19

[56] References Cited

U.S. PATENT DOCUMENTS

| | | |
|---|---|---|
| 3,062,994 | 11/1962 | Mesh . |
| 4,166,244 | 8/1979 | Woods et al. . |
| 4,357,113 | 11/1982 | Brooks . |
| 4,404,516 | 9/1983 | Johnson, Jr. . |
| 4,462,249 | 7/1984 | Adams . |
| 4,464,081 | 8/1984 | Hillier et al. ............... 405/128 X |
| 4,543,013 | 9/1985 | Wagner et al. .................. 405/128 |
| 4,618,855 | 10/1986 | Harding et al. . |
| 4,646,069 | 2/1987 | Andrejasich et al. . |
| 4,679,637 | 7/1987 | Cherrington et al. ........... 175/53 X |
| 4,709,577 | 12/1987 | Thompson . |
| 4,725,551 | 2/1988 | Thompson . |
| 4,754,136 | 6/1988 | Blakely . |
| 4,834,193 | 5/1989 | Leitko et al. ................... 175/73 X |
| 4,846,604 | 7/1989 | Holtmann .................... 405/129 X |
| 4,876,530 | 10/1989 | Hill et al. . |
| 4,896,528 | 1/1990 | Lewis . |
| 4,929,049 | 5/1990 | Le Goullon et al. . |
| 5,026,139 | 6/1991 | Klainer et al. . |
| 5,048,324 | 9/1991 | Thompson . |
| 5,052,215 | 10/1991 | Lewis . |
| 5,163,520 | 11/1992 | Gibson et al. ................... 173/73 X |
| 5,180,251 | 1/1993 | Paurat et al. .................... 405/129 |
| 5,255,749 | 10/1993 | Bumpurs et al. ............... 175/73 X |

FOREIGN PATENT DOCUMENTS

| | | |
|---|---|---|
| 1804441 | 5/1970 | Fed. Rep. of Germany . |
| 3607499 | 9/1987 | Fed. Rep. of Germany ...... 405/129 |

*Primary Examiner*—Dennis L. Taylor
*Attorney, Agent, or Firm*—Vaden, Eickenroht, Thompson, Boulware & Feather

[57] ABSTRACT

A method and apparatus for detecting and localizing a leak from an above-ground liquid storage tank is disclosed. The invention utilizes a fiber optic chemical sensor to sense vapor from the liquid stored in the tank through a plurality of horizontal bores created at spaced intervals through the strata underneath the tank. Each of the plurality of horizontal bores is connected to a vacuum pump and manifold system which delivers the vapor or liquid present in the strata underneath the tank, resulting from diffusion or leakage in the tank, to the fiber optic chemical sensor. The horizontal bores are created with the use of a pilot which protects the bottom of the tank from punctures and ensures that the bores lie in close proximity to the bottom of the tank, enabling the detection of leaks in the tank as they develop. A seal and conduit assembly is utilized for localization of a leak within the vicinity of a horizontal bore by exposing the vapor or liquid present in an isolated longitudinal section of the bore to the fiber optic chemical sensor.

8 Claims, 5 Drawing Sheets

METHOD AND APPARATUS FOR TESTING ABOVE GROUND LIQUID STORAGE TANKS FOR LEAKS

BACKGROUND OF THE INVENTION

This application is a continuation-in-part of co-pending application Ser. No. 07/925,372, filed Aug. 4, 1992 and entitled "METHOD AND APPARATUS FOR TESTING ABOVE GROUND STORAGE TANKS."

The present invention relates to the detection, localization, and quantification of leaks in a liquid storage vessel. More particularly, the present invention relates to a method and apparatus for detecting leaks in above ground liquid storage tanks by detecting the presence of vapor or liquid from the liquid stored in the tank in the strata underneath the tank.

Environmental awareness and concern for the economic loss from lost product has resulted in a relatively recent emphasis on insuring the tightness of liquid storage vessels. Of primary concern is the potential for contamination of underground water supplies caused by leaking gasoline or other refined petroleum products. In response to political pressures exerted by environmental and other interest groups, governmental authorities have imposed strict controls on the operation of such facilities to prevent contamination and to help arrest the deteriorating state of the environment.

Enforcement of these regulations has created a new and significant demand for testing procedures and equipment capable of detecting ever smaller amounts of leaking gasoline. For instance, current United States governmental regulations specify that the maximum allowable leakage from above ground storage tanks (ASTs) be no greater than 5 gallons per hour and it is expected that future standards will be even lower.

Most of the equipment and procedures currently known in the art for testing above ground storage tanks are not sufficiently accurate, and lack the greater resolution and precision required, to test against the lower standards. Improved methods such as that described in U.S. Pat. No. 4,462,249 have made it possible to test underground storage tanks for leaks even smaller than 0.1 gal/hr, but so far as is known, no methods capable of such precision are available for testing above ground tanks for such leaks.

The difficulty with the testing of ASTs has been recognized for a long time. The diameter of such tanks is such that the drop in liquid level from a leak is barely perceptible because it is such a small portion of the total volume of the liquid tank in the tank. As noted in U.S. Pat. No. 3,062,994, in a tank having a diameter of two hundred feet, 10,000 gallons of liquid must be lost for the level to drop by 0.5 inches. If the capability existed to measure to measure such volumes accurately, a 0.05 inch decrease in the liquid level (and assuming a linear correlation between liquid level and volume) would evidence the loss of 1,000 gallons, which is a leak which is considered a major environmental incident by current criteria. The size of these tanks also requires that the leak be located for repair. The tanks are often so large and expensive that replacement in the event of a leak is cost prohibitive such that repairs are required. Of course, finding the leak in the tank is a prerequisite to an effective repair.

The patent literature evidences many attempts to overcome the difficulty of detecting the location of a leak in an AST. For instance, U.S. Pat. No. 5,052,215 describes a method by which fluid is injected in the base beneath an above ground storage tank to enhance the rate of leakage from the bottom of the tank; leakage is then detected with acoustic sensors placed around the tank. Another approach is to use volatile liquid tracers as described in U.S. Pat. No. 5,048,324. The patent literature also includes grids or arrays of electronic probes (U.S. Pat. No. 4,646,069) for detecting the presence of the liquid that has leaked from the tank, ducts for conveying the gases from an escaped liquid past a sensor (U.S. Pat. No. 4,618,855), conductive wires which undergo a change in electrical properties when contacted by escaped liquid (U.S. Pat. No. 4,404,516), and reference and sensing electrodes for measuring changes in electric potential in the substrate/soil under the tank caused by escaped liquid (U.S. Pat. No. 4,166,244).

The above-mentioned, non-volumetric method described in U.S. Pat. No. 4,646,069, with the disclosure of an array of electronic probes, would provide at least some information as to the location of the leak. However, unless those probes are located close together, it may not be possible (because of the size of the tank) to localize the leak to a location any more precise than an area of several square feet on the bottom of the tank. There is the additional consideration as to the expense of using enough probes to increase the ability of such a system to localize the leak such that cost and resolution capability is always a trade-off. Further, many ASTs are constructed on a bed of sand or gravel such that liquid and vapor originating at one point under the AST may be detected elsewhere. U.S. Pat. No. 4,896,528 describes a grid of test conduits under the tank and a description of isolating a portion of the conduits to better localize the leak, but the description is less than explicit and the cost and complication of the many conduits are disadvantageous.

It is, therefore, a principal object of the present invention to provide an improved method for localizing a leak in an above ground storage tank. Another object of the present invention is to provide an improved method and apparatus for placing sensors for detecting the presence of liquid which has leaked from an above ground storage tank in the strata underneath the tank. Other objects, and the advantages, of the present invention will be made clear to those skilled in the art by the following description of a presently preferred embodiment thereof.

SUMMARY OF THE INVENTION

In one aspect, the present invention applies fiber optic chemical sensor (FOCS) technology to detect and localize leaks from liquid storage tanks through a plurality of horizontal bores created at spaced intervals in the sand or other fill material underneath the tank. Creation of these bores necessitates boring holes in the concrete ring wall supporting the tank as well. The horizontal bores through the fill are created by forcing a pilot, which protects the bottom of the tank from punctures while ensuring that the bores remain in close proximity to the tank bottom, mounted on the end of a pipe into the sand through the holes in the ring wall. The pipe is provided with a plurality of perforations through the walls thereof and, once forced into the fill to the desired location, form the bore contemplated by the present invention.

Suction is applied to all of the bores simultaneously through a vacuum pump and manifold system for a period of time sufficient to release and withdraw the vapor which has previously diffused through the floor of the tank and become entrapped in the strata through which the bores lie. Alternatively, pressure is applied to another bore on the opposite side at tank to flush the vapor or liquid out from under the tank. If no leaks are present, the detected concentration of hydrocarbons (specific to the liquid stored in the tank) found in the vapor removed from the bores will continue to decrease until reaching the level of these hydrocarbons found to exist in the above-ground atmosphere in close proximity to the tank wall. If the detected hydrocarbon concentration stabilizes at some point above this local diffusion level, which may be referred to as "background noise", then a leak exists in the bottom of the tank.

The fiber optic chemical sensor measures the amount of light returned from an optical fiber coated with a compound known to be sensitive to the liquid in the tank that is either positioned in the manifold or in the bore under the tank. The compound attracts and holds the hydrocarbon vapor or liquid, thereby increasing the amount of light escaping from the fiber due to the hydrocarbon's greater index of refraction. The fiber optic sensor is placed in the vacuum line and the end is coated with a fluorescing compound. Any loss in the quantity of light transmitted from the fluorescing compound is directly proportional to the quantity of the hydrocarbons in the bore(s) under the tank.

Once the presence of a leak is determined, it is localized by applying a vacuum to each of the horizontal bores independently. The FOCS is again used to detect hydrocarbons in the proximity of the bore indicating a local perforation in the bottom of the tank. Alternatively, the FOCS, or a number of such sensors, are permanently installed at the "well head" formed by the bore(s) for use in continuously monitoring the AST for the presence of a leak.

A leak may be further localized by selectively isolating longitudinal sections of the bore identified as lying in proximity to the leak. This localization is accomplished with a conduit and seal assembly comprising two cylindrical expandable elements which form a seal against the inner diameter of the bore. The expandable elements seal against the ends of a perforated conduit which restricts axial movement of the expandable elements. The vapor or liquid which has leaked from the tank is pulled by the vacuum into the perforated conduit, through a coupling mounting the conduit and seal assembly onto a pipe which is used to position the assembly in the bore, and through the pipe to the outside of the horizontal bore. Movement of the vapor may also be enhanced by air into the pipes. The FOCS enables the detection of hydrocarbons and thereby localizes the leak to the immediate vicinity of a selected longitudinal section of the bore.

DETAILED DESCRIPTION OF THE PREFERRED EMBODIMENTS

Figure 1:
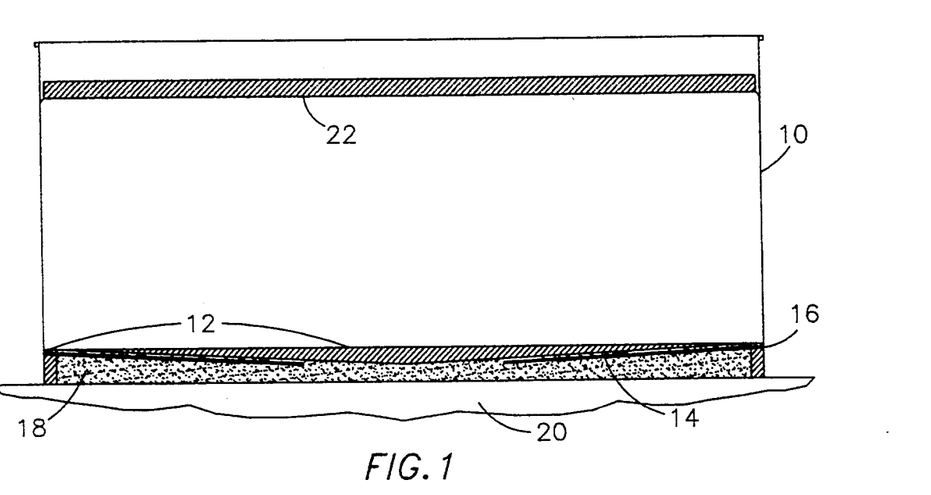
FIG. 1 is a cross-sectional view of an above-ground liquid storage tank.

Referring to FIG. 1, there is shown a cross-section of a typical above-ground liquid storage tank 10. Liquid storage tank 10 is constructed on a base comprised of a concrete ring wall 12 and a bed 18. It is understood by those skilled in the art that many specific types of construction of tank 10 and bed 18 may be encountered and that some may not have the structure shown in FIG. 13. For instance, not all ASTs are built on a foundation including a concrete end wall. The present invention is nonetheless adaptable for use in connection with such tanks.

In the idealized tank 10 shown in FIG. 1, the diameter of concrete ring wall 12 corresponds to that of the walls of tank 10 such that the entire circumference of the tank is supported by concrete. The bed 18 inside concrete ring wall 12 is usually filled with washed, crushed rock of a known size or sand which provides support and minimizes corrosive reactions at the bottom of tank 10 (again, other materials, and varying degrees of compaction, are often encountered). Concrete ring wall 12 rests on or within a supporting layer of backfill 20. The crushed rock or sand comprising bed 18 is porous and vapor conductive, thus allowing leaks from liquid storage tank 10 to permeate the bed 18 and invade the underlaying backfill 20. Those skilled in the art who have the benefit of this disclosure will recognize that the system and method of the present invention has utility with virtually any type of tank installation, whether the tank is supported by a concrete ring wall, concrete slab, sand bed, earth backfill, or any other means.

Figure 2:
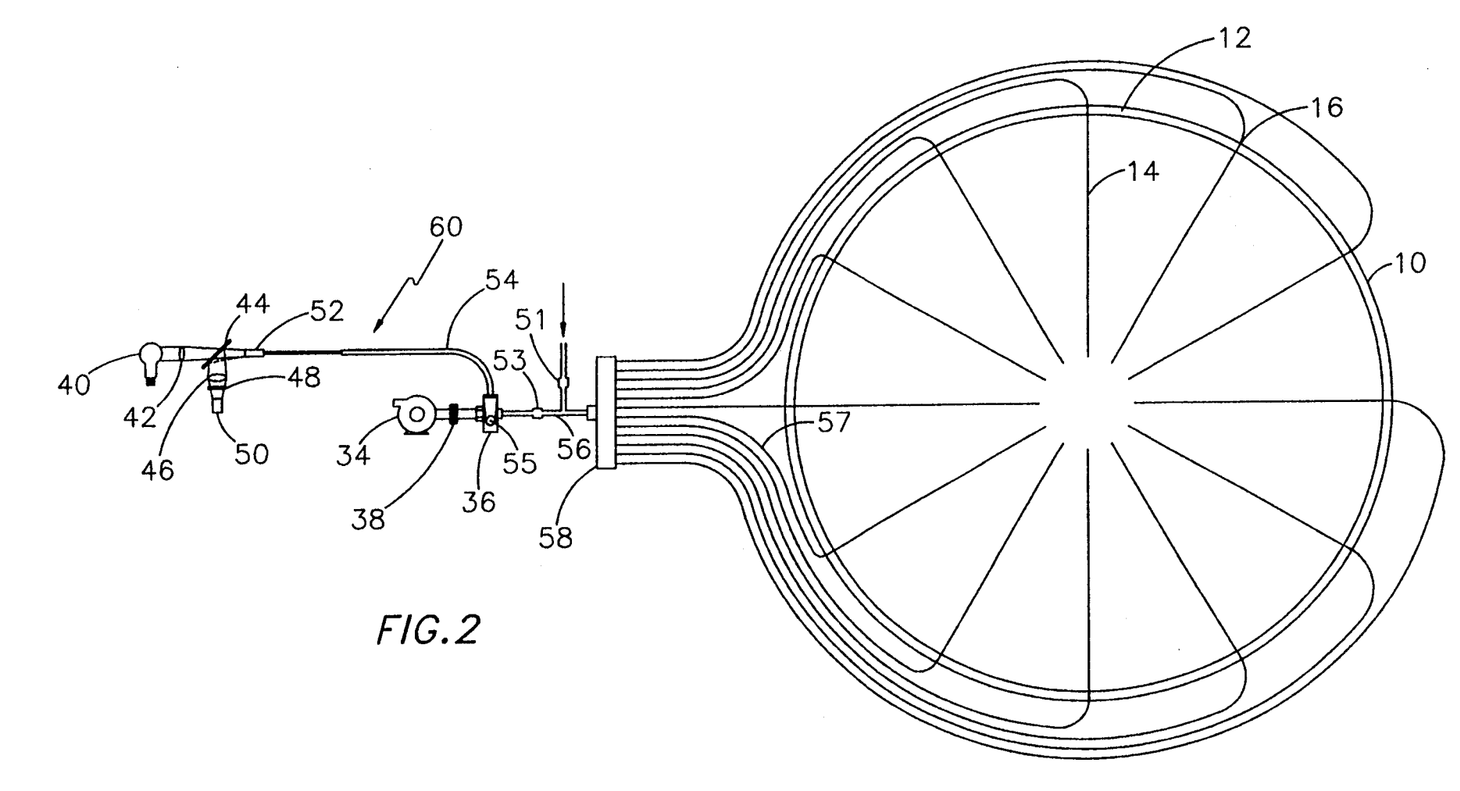
FIG. 2 is a schematic drawing of a plurality of spaced, substantially horizontal bores located in the strata under an above ground liquid storage tank and having a fiber optic chemical sensor system connected thereto in accordance with the teachings of the present invention to detect the presence of vapor or liquid resulting from a leak in the tank.

As shown in FIGS. 1 and 2, the bed 18 of tank 10 is provided with a plurality of spaced substantially horizontal bores 14. It will be recognized by those skilled in the art that the circumferential spacing of the horizontal bores 14 depicted in FIG. 2 is but one of numerous divisions of the bed 18 which may be utilized for the localization of leaks from the tank. In a preferred embodiment of the present invention in which the bores 14 comprise part of a permanent tank monitoring system as described in more detail below, the spacing of the bores 14 is calculated based upon known data for horizontal spreading of the specific liquid in tank 10 through the material comprising bed 18 (e.g., a certain number of feet per day) and the required speed of detection of the leak. For instance, if a liquid such as No. 2 heating oil migrates through sand of a specific size at a rate of, for instance, two feet per day, and it is desired to detect a leak of that liquid in two days, the bores 14 are spaced such that a bore is located within four feet of any location on the bottom of tank 10. The horizontal bores 14 also provide a convenient pathway for vapor or liquid which has leaked from tank 10 to accumulate.

Figures 3A, 3B, 3C:
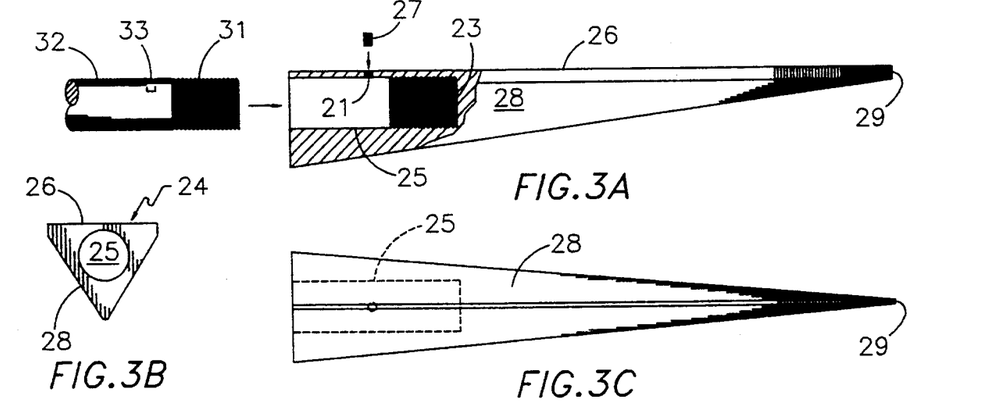
FIG. 3A is a side elevational view of a preferred embodiment of a pilot constructed in accordance with the teachings of the present invention which is used to create a substantially horizontal bore under an above ground liquid storage tank.
FIG. 3B is an end view of the pilot of FIG. 3A.
FIG. 3C is a bottom view of the pilot of FIG. 3A.

A pilot, indicated generally at reference numeral 24 in FIGS. 3A, 3B, and 3C, is utilized to create the horizontal bores 14 under liquid storage tank 10. Pilot 24 is mounted on the end of a piece of pipe or other conduit 32 to function as a guiding tool for the mechanism employed to create the horizontal bores 14 through concrete ring 12 and bed 18.

As shown in FIG. 3B, pilot 24 is generally triangular in cross-section with a substantially flat upper surface 26 and a downwardly extending keel 28 along the length thereof, both upper surface 26 and keel 28 tapering to a point 29. The end of pilot 24 opposite point 29 is provided with a longitudinal bore 25 formed therein for receiving the end of a pipe 32. Threads 23 are formed at the end of bore 25 closest to point 29 for receiving a matching set of threads 31 on pipe 32 for retaining the pilot 24 on pipe 32. In a particularly preferred embodiment, pilot 24 is provided with means for preventing rotation of pilot 24 on the end of pipe 32 as pipe 32 is advanced into the bed 18 under tank 10. This rotation prevention means, in one embodiment, takes the form of a threaded pin 27 which is introduced into the threaded bore 21 which opens from the top surface 26 of pilot 24 into the bore 25 running longitudinally through pilot 24. When introduced into bore 21, pipe 32 is rotated until the hole 33 in the end of pipe 32 is aligned with pin 27, at which point pin 27 drops down into hole 33, allowing the threads on pin 27 to engage the threads of bore 21. Pin 27 is then tightened to prevent rotation of pilot 24 relative to pipe 32. In a second preferred embodiment, the rotation prevention means takes the form of a jam nut (not shown) which is threaded onto the threads 31 on the end of pipe 32 before the pilot 24 is spun onto those same threads 31. After pilot 24 is snugged onto the end of pipe 32, the jam nut is rotated back up the threads 31 into engagement with the end of pilot 24 opposite point 29, thereby preventing relative rotation of pilot 24.

Figure 4A:
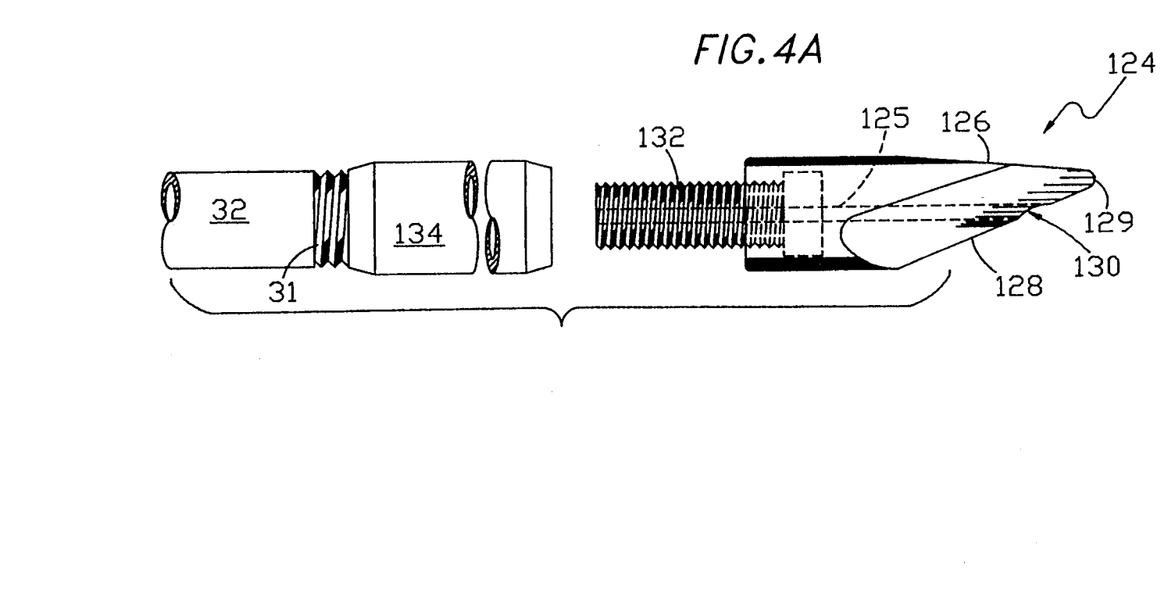
FIG. 4A is a side elevational view of a second preferred embodiment of a pilot constructed in accordance with the teachings of the present invention which is mounted on the end of a pipe for forcing into the fill material in the bed under the tank to create a bore under an above ground storage tank.
Figure 4B:
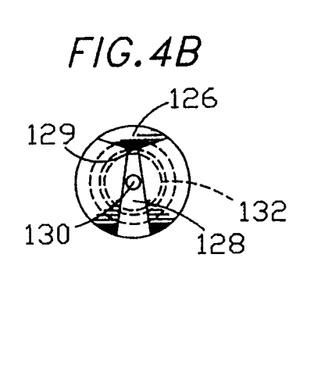
FIG. 4B is an end view of the pilot of FIG. 5A.

Referring now to FIGS. 4A and 4B, a second embodiment of a pilot constructed in accordance with the present invention is indicated generally at reference numeral 124. In the embodiment shown, pilot 124 is comprised of a polymeric material which is polymerized around a bolt (shown in shadow lines) to provide a set of threads 132 which mate with the internal threads of the coupling 134, the coupling 134 being provided with a second set of internal threads for mating with the threads 31 of pipe assembly 32 for forcing into the bed 18 to form a bore 14. Pilot 124 is provided with a tapered upper surface 126 and keel 128 which form a point 129 to decrease the resistance of the fill or other material comprising bed 18 to the forcing of the pipe and pilot assembly 32 therethrough. A longitudinal bore 125 runs through pilot 124, opening through the hole 130 in keel 128 for passage of air under pressure therethrough, it having been found that the blowing of compressed air through pilot 124 and out of the hole 130 as the pipe and pilot assembly 32 is being forced into the strata under the tank helps to compact the walls of the bore. Of course the pipe 32 on which pilot 124 is mounted may be perforated so as to form the bore 14 under the tank 10, and it is therefore sometimes advantageous, depending upon the nature of the material comprising the bed 18, to run a pipe of smaller diameter (not shown) into the pipe 32 so that the air being forced therethrough is routed all the way through the length of pipe 32 to the pilot 124.

The process of creating a horizontal bore 14 first entails boring a hole 16 in concrete ring wall 12. Those skilled in the art will recognize that numerous concrete "hole-saw" drilling attachments are commercially available for this purpose. An axial force is then applied to the end of pipe assembly 32 which is not connected to pilot 24, thus driving the pipe 32 having pilot 24 mounted thereto into bed 18 to the desired bore length. In a presently preferred embodiment shown in FIG. 5, means is provided for releasably attaching to each pipe 32 for forcing the pipe 32 into the strata underneath tank 10 in the form of the pusher indicated generally at reference numeral 88. Pusher 88 is comprised of a substantially rectangular plate 90 to which wheels (not shown) can be mounted or which can be mounted to a dolly or pallet to facilitate movement and placement of pusher 88 and which serves as a chassis to which the other components are mounted. The blocks 92 mounted to each end of plate 90 and tubes 94 mounted to blocks 92 form a track running the length of plate 90 on which the T-head 96 and traveling block 98 slide back and forth under the influence of the pneumatic cylinders 100. The pneumatic cylinders 100 are mounted to plate 90 and the rams 102 of the cylinders 100 are pinned to T-head 96 so that extension and retraction of rams 102 causes T-head 96 to slide back and forth on the tubes 94, linear bearings 104 being mounted in the bores through T-head 96 to facilitate smooth, low friction movement.

Traveling block 98 is likewise provided with linear bearings 104, and a pneumatic vise 106 is mounted to the top surface of traveling block 98 for releasably attaching to the pipe 32. Although vise 106, in the preferred embodiment, is a Heinrich double-acting air vise (available from Bass Tool, Houston, Tex., Model DA-3301, DA-4401, or DA-6601), those skilled in the art who have the benefit of this disclosure will recognize that other similar tools can be used to advantage, including a manual vise/pipe clamp. A groove is formed in the top surface of T-head 96, with a similarly-shaped groove being formed in the clamp plate 112, to form a bore 114 into which an air hammer (not shown) is clamped by tightening of the bolts recessed in the holes 116 in clamp plate 112, which are received in threaded bores (not visible in FIG. 5) formed in T-head 96. The shaft (not shown) of the air hammer projects through bore 114 and is received within a threaded hole which is not visible in FIG. 5 but which is formed in the end of traveling block 98 which faces the surface 120 of T-head 96 so that T-head 96 and traveling block 98 slide back and forth together on the track when connected by the air hammer. Although not necessary for all ASTs, the air hammer is operated to vibrate the pipe 32 while the pneumatic cylinders 100 are forcing the pipe 32 into the strata underneath the tank. Vibrating the pipe 32 in this manner helps to overcome the resistance of the fill material comprising bed 18 to the forcing of the pipe 32 therethrough.

Figure 5:
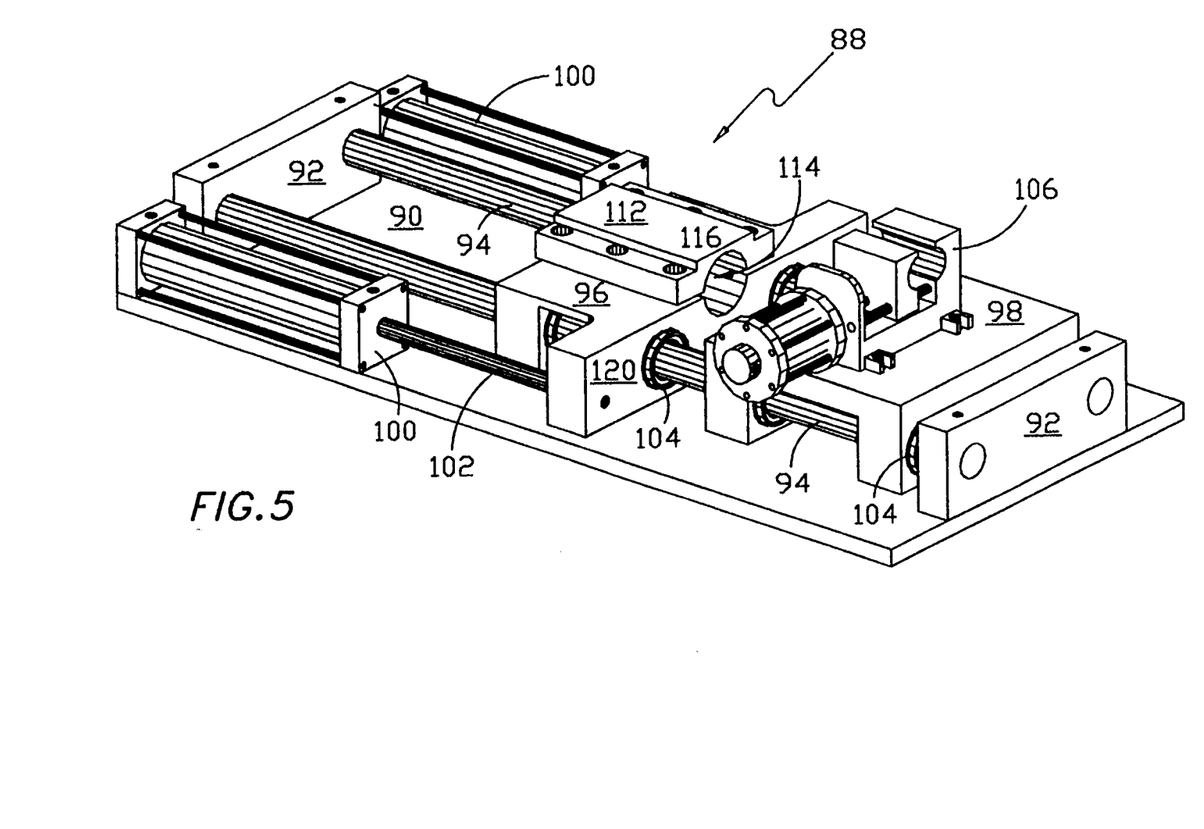
FIG. 5 is a perspective view of an apparatus for forcing a pipe, having the pilot of FIGS. 3 or 4 mounted to the end thereof, into the bed under an above ground storage tank to create a substantially horizontal bore in the bed.

The resistance to the forcing of pipe 32 into bed 18 also causes the pusher 88 to be pushed away from the periphery of tank 10. This tendency of the pusher 88 to move in reaction to this resistance can be counteracted in a number of ways. As noted above, the plate 90 of pusher 88 can be mounted to a dolly (not shown) to facilitate movement of pusher 88, and in a presently preferred embodiment, the dolly is provided with retractable legs which are driven into the soil or fill around the periphery of the tank 10 to resist that movement. Alternatively, the dolly is provided with a large magnet for attraction to the outside wall of tank 10 or a pair of retractable hooks for engaging either the groove formed in the top surface of the end wall 12 in which the wall of tank 10 rests or the upwardly turned rim which is formed at the bottom of the wall of some ASTs. A number of other equivalent mechanisms for resisting this tendency will be apparent to those skilled in the art who have the benefit of this disclosure.

The elongate wedge shape of pilots 24 and 124 (when viewed in elevational, side view as shown in FIGS. 3A and 4A, respectively) causes the end of the pipe assembly 32 to which the pilot 24 or 124 is mounted to tend upwardly as the pipe 32 is forced into the bed 18, the keel 28 or 128 tending to resist lateral (e.g., side-to-side) movement as the pilot is advanced into the material comprising bed 18, thereby helping to insure that the bore maintains its intended path. It is, of course, highly desirable to avoid damage to the bottom of tank 10 while the pipe assembly 32 is being forced into bed 18, and even though pilot 24 and 124 causes the end of the pipe assembly 32 to tend upwardly as the pipe is being advanced, the flat upper surface 26 of pilot 24 and tapered surface 126 of pilot 124 causes the pilot 24 or 124 to plane along the underside of the bottom of the tank, thereby decreasing the likelihood of any such damage.

Those skilled in the art will realize that, in the presence of a leak, an appreciable quantity of vapor and/or liquid from the liquid stored in tank 10 will be present in the sand bed 18 in the immediate vicinity of the perforation in tank 10 causing the leak. The permeable nature of bed 18 allows the vapor and/or liquid to diffuse throughout the bed forming a "pool" of vapor and/or liquid underneath tank 10. It is therefore necessary to deplete the pool of vapor and/or liquid present in bed 18 resulting from diffusion through the bed to accurately identify the precise region of bed 18 in which the leak in tank 10 lies. The plurality of horizontal bores 14 created under tank 10 (or perforated pipes 32) are manifolded together with manifold lines 57 for initial qualitative assessment of the presence of leaks in tank 10, as schematically illustrated in FIG. 2. Manifolding the bores in this manner facilitates simultaneous removal of vapor and/or liquid, which have escaped from tank 10 through a perforation in the tank floor, currently entrapped in bed 18 in the vicinity of each of the horizontal bores 14 under tank 10. In a presently preferred embodiment, a vacuum pump 34, equipped with liquid sensor 38, is used to create a suction at the manifold 58 thereby inducing simultaneous removal of the diffused vapor and/or liquid entrapped in the sand layer 18 in the vicinity of the horizontal bores 14 through manifold lines 57. The vapor is pulled through manifold 58 into vacuum line 56 where it contacts optical fiber 54 at vacuum line interface 36.

In a particularly preferred embodiment, a vacuum pressure gauge (not shown) is used to monitor the pressure in manifold 58. In the event the pressure in manifold 58 continues to decrease, indicating a lack of air flow into and through the pipes 32 in the bores under tank 10, the valve 53 in line 56 is closed, valve 51 is opened, and nitrogen from a cylinder of compressed gas expands into the manifold bores to open the perforations in the pipes 32 by forcing any sand closing those perforations back from the pipe 32.

As described in more detail in S. M. Klainer, et al., A Fiber Optic Chemical Sensor (FOCS) for Monitoring Gasoline, U.S. Environmental Protection Agency Environmental Monitoring Systems Laboratory Publication No. EPA/600/X-88/259 (Contract No. 68-03-3249) (1988), the FOCS, indicated generally at reference number 60, utilizes an optical fiber 54, the surface of which is coated with a material known to selectively attract the hydrocarbons present in the liquid in tank 10, as a sensor. The presence of hydrocarbons on the coating causes an increase in the index of refraction of the coating, thereby increasing the amount of light lost through optical fiber 54. Light is transferred to optical fiber receptacle 52 by means of light source 40 which passes through converging lens 42 and one-way mirror 44. The light passes through the optical fiber 54 and strikes the fiber end 55 which is coated with a fluorescing compound. The fluorescing compound on fiber end 55, once excited, produces light of a different color and wavelength than that of the source light. This fluoresced light travels back up optical fiber 54, exiting receptacle 52. This light then strikes one-way mirror 44 and is reflected out of the path of the source light into converging lens 46 and light sensor 50. Comparison of the measured amount of fluoresced light exiting optical fiber 54 with the known amount of source light transmitted into the fiber indicates the quantity of hydrocarbon vapor in contact with the surface of the fiber. The FOCS system 60 is sensitive to as little as one part per million of selected hydrocarbons.

When vacuum pump 34 is activated, FOCS 60 initially detects the hydrocarbons present in the sand of bed 18 resulting from diffusion through the bed of the vapor and/or liquid which has leaked from tank 10. After a sufficient period of time, this vapor and/or liquid entrapped in bed 18 is sufficiently evacuated to detect a drop in the level of hydrocarbons detected by optical fiber 54 in vacuum line interface 36. A separate sensor (not shown) placed in the atmosphere in the vicinity of tank 10 will give an indication of the level of "background noise" due to diffusion through the tank wall, which may be assumed to be consistent with the hydrocarbon concentration present in the air conductive sand layer 18 resulting from diffusion through the tank floor. If the level of hydrocarbons (specific to the liquid stored in tank 10) detected with FOCS 60 from vapor removed from the bores 14 stabilize at a point above the measured background noise, then a leak is present in the bottom of tank 10. Those skilled in the art having the benefit of this disclosure will recognize that FOCS 60 could alternatively be calibrated to a zero point at this level of hydrocarbon "background noise". In this embodiment of the invention, a positive stabilized hydrocarbon reading with FOCS 60 would indicate the presence of a leak in tank 10.

Once a leak in tank 10 is qualitatively detected, the next step is to identify the horizontal bore(s) 14 which lie(s) in the vicinity of the leak. Each of the plurality of horizontal bores 14 is independently isolated using manifold 58, and the qualitative procedure for detecting the presence of a leak is repeated for each bore. Vacuum pump 34 is activated to remove any vapor and/or liquid which has leaked from tank 10 in the vicinity of each individual horizontal bore 14. If the level of hydrocarbon detected with FOCS 60 stabilizes above the previously detected level of background noise, the bore 14 under vacuum likely lies in the proximity of a leak and will be subject to a further isolation procedure. In the event that increased precision in localizing the leak in advantageous, additional bore(s) are created by forcing an additional pipe and pilot assembly into the bed 18 and connecting each additional pipe to FOCS 60 in serial fashion.

In an alternative embodiment, used for continuous monitoring of the tank 10 for leaks, a sensor 60 is located at the periphery of tank 10 at each of the bores 14, e.g., at each "well head." In this alternative embodiment, the end of each pipe assembly 32 which opens through the ring wall 12 is connected to a hose which is routed into a suitable protective enclosure (not shown) in which a sensor 60 is located, the fiber end 55 having the fluorescing compound thereon being located within the hose so as to detect the presence of the particular vapor of interest. Because the perforated pipe forming the bore 14 provides a conduit for unimpeded migration of the vapor, no vacuum need be applied to detect the presence of the vapor. The output signal from FOCS 60 is routed from the enclosure at each well head to a junction box (not shown) where it is multiplexed and either output to an on-site control and data collection station or transmitted, for instance, by microcomputer and modem, to a remote location at which an alarm or other alert is used to apprise the tank operator of the presence of a possible leak.

Figure 6:
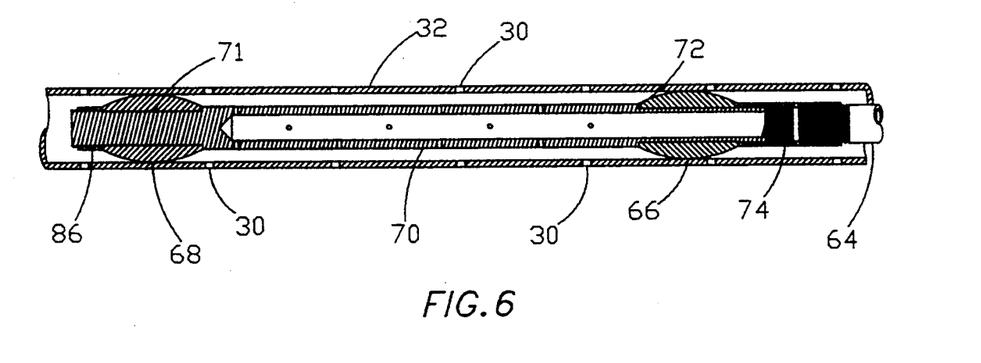
FIG. 6 is a sectional view of a conduit and seal assembly constructed in accordance with the teachings of the present invention which is used to isolate a longitudinal section of a horizontal bore under a liquid storage tank.

Once the presence of vapor indicates a possible leak, the final step for localizing the leak involves isolating longitudinal sections of the horizontal bore(s) 14 determined to lie in the vicinity of the leak. Referring to FIG. 6, threaded pipe 64 is used to selectively position a conduit and seal assembly (shown in FIG. 6) within the perforated pipe 32 forming horizontal bore 14. The conduit and seal assembly, connected to threaded pipe 64 by coupling 74, includes selectively radially expandable elements 66 and 68 on each end of a perforated conduit 70. In a presently preferred embodiment, elements 66 and 68 are made of a rubber or synthetic compound such as urethane and are fitted over a reduced diameter portion at each end of conduit 70, the shoulders 72 prohibiting relative axial movement of respective elements 66 and 68. A coupling 74 is threaded at both ends, the threads at one end sized to engage threads on one end of perforated conduit 70 and the threads at the other end being sized to engage threads on the end of pipe 64. A jam nut 86 is threaded onto the blind end of conduit 70 so that, when pipe 64 is rotated the expandable element is compressed between the edge of coupling 74 and shoulder 72 and the expandable element 68 is compressed between the second shoulder 72 on conduit 70 and jam nut 86. Once the expandable elements 66 and 68 are expanded in this manner, the conduit and seal assembly is inserted into pipe 32 and selectively positioned in the pipe to seal a longitudinal section of bore 14 by forming a seal against the inner diameter of perforated pipe 32.

Once a longitudinal section of the horizontal bore 14, identified as lying in proximity to the leak, is isolated, vapor and/or liquid which has leaked from tank 10 is withdrawn from bed 18 through the perforations 30 in the isolated portion of pipe assembly 32 and into the perforated conduit 70 by applying a vacuum to the outer end of pipe 64. Vacuum pump 64 again moves vapor from horizontal bore 14 into contact with optical fiber 54. If the level of hydrocarbons detected by FOCS 60 is at or below the previously measured level of background noise, then the leak does not exist in the immediate vicinity of the isolated section of bore 14. Continued selection of isolated longitudinal sections of bore 14 enables precise localization of (a) leak(s) in liquid storage tank 10.

Figure 7:
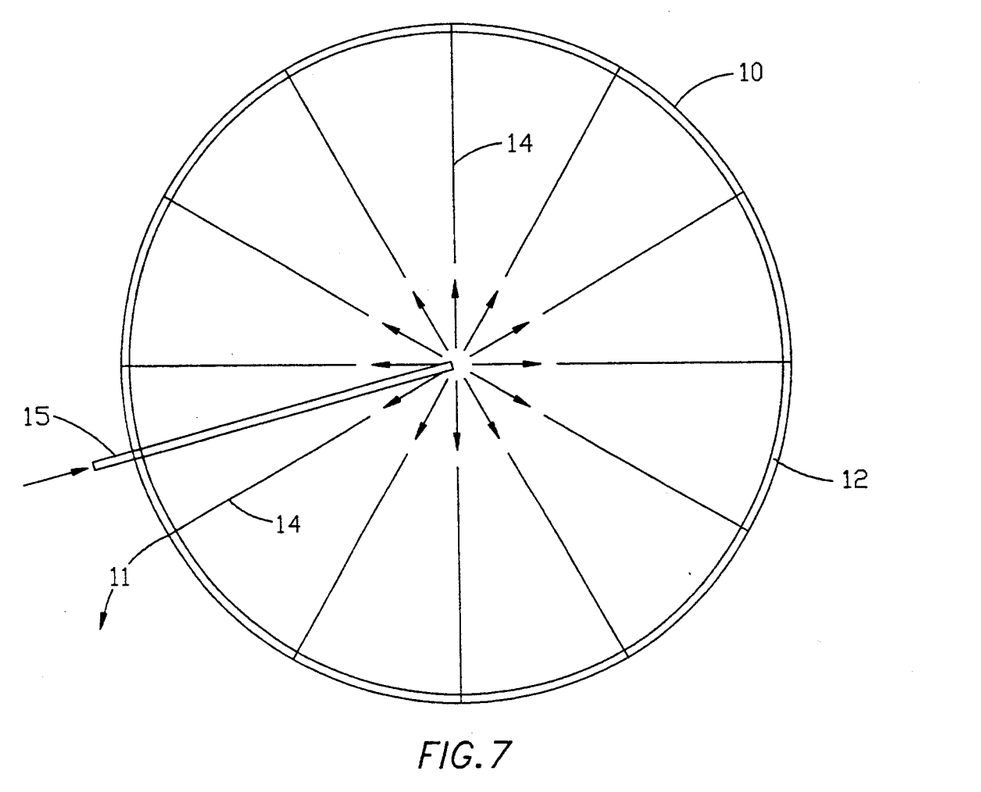
FIG. 7 is a schematic illustration of an alternative embodiment of the present invention.

It will therefore be appreciated by those skilled in the art that a new and useful system and method for detecting leaks from above-ground liquid storage tanks has been described and disclosed. While the present description is considered to be the preferred embodiment of the present invention, it will be apparent that various modifications may be made therein without departing from the true scope and spirit of the present invention, which the claims appended hereto are intended to cover. For example, an alternative embodiment of the present invention, shown schematically in FIG. 8, employs a horizontal bore 15 created in bed 18 with a pilot and pipe assembly extending to the region of bed 18 beneath the center of the floor of tank 10. Compressed inert gas, preferably nitrogen, is introduced to bed 18 through the outlet of horizontal bore 15. The compressed gas flows through the central region of bed 18 and "washes out" vapor and/or liquid leaked from tank 10 into bores 14, which provide pathways of least resistance in the bed 18. A further alternative embodiment employs open-ended conduits within the horizontal bores 14 extending substantially through the length of the bores. Compressed inert gas is introduced to the outlet of the bores 14 but is not introduced to the outlet of the conduits. The compressed gas flows through the length of bores 14 and upon reaching the end of the bore turns into the path of least resistance, that being the pathway provided by open end of the pipes that have been forced into bores 14. The hydraulic action of the compressed gas withdraws vapor and/or liquid, which has leaked from tank 10, through the bed 18, and into the conduits which communicate with FOCS 60.

What is claimed is:

1. A method for creating a horizontal bore under a liquid storage tank comprising the steps of:
   (a) attaching a section of pipe to a pilot to form a pipe and pilot assembly to be forced into the strata under the tank;
   (b) forcing the pipe and pilot assembly into the strata under the tank by applying an axial force to the end of the pipe and pilot assembly opposite the pilot;
   (c) causing the pipe and pilot assembly to tend upwardly as the pipe and pilot assembly is driven into the strata under the tank so as to position the pipe in close proximity to the underside of the bottom of the tank; and
   (d) protecting the bottom of the tank from punctures while the pipe and pilot assembly is being driven into the strata.

2. The method of claim 1 additionally comprising drilling a hole into the strata under the tank before forcing the pipe and pilot assembly, using the hole as a pilot hole, into the strata.

3. The method of claim 1 additionally comprising compacting the walls of the bore.

4. The method of claim 3 wherein air is blown through the pilot under pressure while the pipe and pilot assembly is being forced into the strata to compact the walls of the bore.

5. The method of claim 1 wherein the pipe of the pipe and pilot assembly is provided with a plurality of holes through the walls thereof, the pipe and pilot assembly forming the bore in the strata.

6. The method of claim 5 wherein the pipe of the pipe and pilot assembly is provided with a pipe of smaller diameter without holes in the wall thereof and air is blown through the smaller diameter pipe and out the pilot while the pipe and pilot assembly is being forced into the strata to compact the walls of the bore.

7. The method of claim 5 wherein air is blown into the pipe of the pipe and pilot assembly and out of the holes in the pipe under pressure to compact the walls of the bore.

8. The method of claim 1 additionally comprising vibrating the pipe as the pipe and pilot assembly is being forced into the strata.

* * * * *